US010271559B2

(12) United States Patent
Nitta et al.

(10) Patent No.: US 10,271,559 B2
(45) Date of Patent: Apr. 30, 2019

(54) SMOKING DEVICE

(71) Applicant: Panasonic Intellectual Property Management Co., Ltd., Osaka (JP)

(72) Inventors: Hiroaki Nitta, Osaka (JP); Taku Kiriishi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/527,897

(22) PCT Filed: Jul. 12, 2016

(86) PCT No.: PCT/JP2016/003289
§ 371 (c)(1),
(2) Date: May 18, 2017

(87) PCT Pub. No.: WO2017/033388
PCT Pub. Date: Mar. 2, 2017

(65) Prior Publication Data
US 2018/0325132 A1     Nov. 15, 2018

(30) Foreign Application Priority Data

Aug. 27, 2015 (JP) ................ 2015-168075
Aug. 27, 2015 (JP) ................ 2015-168076

(51) Int. Cl.
*F24C 15/32*     (2006.01)
*A23B 4/052*     (2006.01)
(Continued)

(52) U.S. Cl.
CPC .............. *A23B 4/052* (2013.01); *A23L 2/38* (2013.01); *A23L 5/00* (2016.08); *A23V 2002/00* (2013.01)

(58) Field of Classification Search
CPC ....... A23B 4/044; A23B 4/056; Y02A 40/948; A47J 37/0709
(Continued)

(56) References Cited

U.S. PATENT DOCUMENTS 4,355,570 A * 10/1982 Martin ................... A47J 37/06
99/446
5,484,619 A    1/1996 Yamaoka et al.
(Continued)

FOREIGN PATENT DOCUMENTS

GB      2225208 A     5/1990
JP      52-010462     1/1977
(Continued)

OTHER PUBLICATIONS

The Extended European Search Report dated May 18, 2018 for the related European Patent Application No. 16838740.5.
(Continued)

*Primary Examiner* — Patrick F Brinson
(74) *Attorney, Agent, or Firm* — Brinks Gilson & Lione

(57) ABSTRACT

Smoking device includes smoking chamber, smoke generating chamber, smoking heater, communication path, and fan. Smoking chamber houses raw material of a smoked food product. Smoke generating chamber is disposed below smoking chamber. Smoking heater generates smoke in smoke generating chamber by heating smoking material housed in smoke generating chamber. Communication path communicates smoking chamber with smoke generating chamber. Cooling fan cools smoke passing through communication path. According to the present aspect, a desired smoked product can be manufactured by using a sufficient amount of smoke at any smoking temperature.

8 Claims, 7 Drawing Sheets

(51) Int. Cl.
*A23L 2/38* (2006.01)
*A23L 5/00* (2016.01)

(58) Field of Classification Search
USPC .......... 99/480–482, 470; 126/19 R, 21 A
See application file for complete search history.

(56) References Cited

U.S. PATENT DOCUMENTS

| | | | | |
|---|---|---|---|---|
| 5,974,952 | A * | 11/1999 | Riccio | A47J 37/06 126/290 |
| 6,810,792 | B1 * | 11/2004 | Knight | A47J 36/38 99/340 |
| 6,868,777 | B1 * | 3/2005 | Higgins | A23B 4/044 426/314 |
| 7,451,691 | B2 * | 11/2008 | Robertson | A21B 3/04 219/401 |
| 8,563,900 | B2 * | 10/2013 | Han | A21B 1/46 219/411 |
| 8,833,360 | B2 * | 9/2014 | Knight | A47J 37/0754 126/21 A |
| 8,887,627 | B1 * | 11/2014 | Baik | A47J 37/0709 126/41 B |
| 9,395,092 | B2 * | 7/2016 | Knight | F24B 1/207 |
| 9,930,897 | B2 * | 4/2018 | Blue | A47J 37/00 |
| 2004/0185164 | A1 | 9/2004 | Doumoto et al. | |
| 2010/0028502 | A1 * | 2/2010 | Han | A21B 1/46 426/235 |
| 2014/0360387 | A1 | 12/2014 | Bogdon | |

FOREIGN PATENT DOCUMENTS

| | | |
|---|---|---|
| JP | 62-253333 A | 11/1987 |
| JP | 2-255039 | 10/1990 |
| JP | 6-292503 | 10/1994 |
| JP | 2004-229502 | 8/2004 |
| JP | 2005-046043 | 2/2005 |

OTHER PUBLICATIONS

International Search Report of PCT application No. PCT/JP2016/003289 dated Oct. 4, 2016.

* cited by examiner

SMOKING DEVICE

This application is a 371 application of PCT/JP2016/003289 having an international filing date of Jul. 12, 2016, which claims priority to JP2015-168075 and JP2015-168076 both filed Aug. 27, 2015, the entire contents of which are incorporated herein by reference.

TECHNICAL FIELD

The present disclosure relates to a smoking device for manufacturing a smoked product.

BACKGROUND ART

A conventionally known smoking device manufactures a smoked product by exposing a food product such as cheese, ham, or fish to smoke generated by heating a smoking material such as wood chips. For example, in a smoking device described in PTL 1, a food product to be smoked, a smoking material, and a gas burner configured to heat the smoking material are disposed in a smoking chamber. The food product in the smoking chamber is exposed to smoke generated through heating of the smoking material by the gas burner and filling the smoking chamber, and is manufactured into a smoked product.

CITATION LIST

Patent Literature

PTL 1: Unexamined Japanese Patent Publication No. 2005-046043

SUMMARY OF THE INVENTION

Examples of the method of manufacturing a smoked product include hot smoking, warm smoking, and cold smoking. These manufacturing methods have different smoking temperatures: for example, hot smoking is performed at 80° C. to 140° C., warm smoking is performed at 30° C. to 80° C., and cold smoking is performed at 0° C. to 30° C.

When warm smoking and cold smoking, which have relatively low smoking temperatures, are performed in the smoking device described in PTL 1, the fire power of the gas burner is adjusted to be lower than that for hot smoking. However, when the fire power of the gas burner is set to be low, an insufficient amount of smoke is generated from a smoked smoking material, and a longer time is required to complete warm smoking or cold smoking or a desired smoked product cannot be manufactured in some cases.

The present disclosure is intended to provide a smoking device capable of manufacturing a desired smoked product by using a sufficient amount of smoke at any smoking temperature.

A smoking device according to an aspect of the present disclosure includes a smoking chamber, a smoke generating chamber, a smoking heating unit, a communication path, and a cooling unit. The smoking chamber houses a raw material of a smoked food product. The smoke generating chamber is disposed below the smoking chamber. The smoking heating unit generates smoke in the smoke generating chamber by heating a smoking material housed in the smoke generating chamber. The communication path communicates the smoking chamber with the smoke generating chamber. The cooling unit cools smoke passing through the communication path.

According to the present aspect, a desired smoked product can be manufactured by using a sufficient amount of smoke at any smoking temperature.

DETAILED DESCRIPTION OF THE PREFERRED EMBODIMENTS

Figure 1:
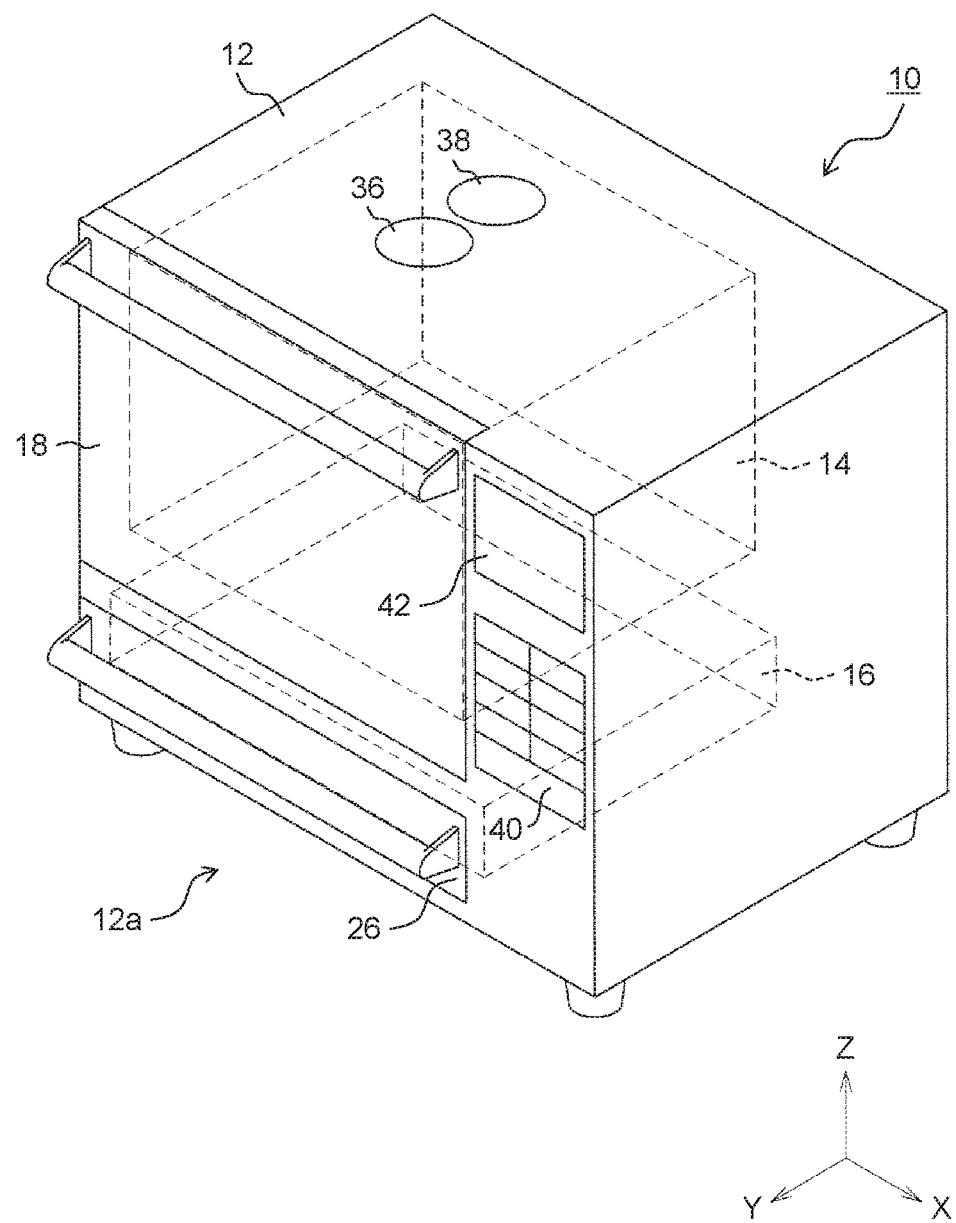
FIG. 1 is a schematic perspective view of a smoking device having a fermentation function according to an exemplary embodiment of the present disclosure.

A smoking device according to an aspect of the present disclosure includes a smoking chamber, a smoke generating chamber, a smoking heating unit, a communication path, and a cooling unit. The smoking chamber houses a raw material of a smoked food product. The smoke generating chamber is disposed below the smoking chamber. The smoking heating unit generates smoke in the smoke generating chamber by heating a smoking material housed in the smoke generating chamber. The communication path communicates the smoking chamber with the smoke generating chamber. The cooling unit cools smoke passing through the communication path.

According to the present aspect, a desired smoked product can be manufactured by using a sufficient amount of smoke at any smoking temperature.

The smoking device may further include an auxiliary heating unit configured to heat the smoking chamber in an auxiliary manner. According to the present aspect, smoke cooled while passing through the communication path can be heated in the smoking chamber. As a result, a smoked product can be manufactured by using smoke at high temperature.

The smoking device may further include a controller configured to control the smoking heating unit and the auxiliary heating unit. The controller may be configured to stop, after having heated the smoking chamber by using both of the smoking heating unit and the auxiliary heating unit until an internal temperature of the smoking chamber exceeds a smoking temperature, heating by the auxiliary heating unit to allow the internal temperature of the smoking chamber to decrease to the smoking temperature so that a pressure inside the smoking chamber becomes lower than an outside air pressure. According to the present aspect, leakage of smoke from the smoking chamber to the outside can be reduced.

The smoking device according to another aspect of the present disclosure further includes a fermentation bacteria injecting unit configured to inject fermentation bacteria into the smoking chamber, and a controller configured to control the fermentation bacteria injecting unit and the smoking heating unit. The controller is configured to cause the fermentation bacteria injecting unit to inject fermentation bacteria into the smoking chamber, and the smoking heating unit to generate smoke in the smoking chamber after a predetermined wait time has elapsed since completion of the injection. According to the present aspect, a fermented food product can be manufactured for longer storage.

The controller may be configured to sterilize a raw material of a fermented food product by using the smoke generated in the smoking chamber by the smoking heating unit, before the injection of fermentation bacteria into the smoking chamber. According to the present aspect, a fermented food product can be manufactured for longer storage.

The fermentation device may include a temperature sensor configured to detect an internal temperature of the smoking chamber, and the controller may be configured to control the smoking heating unit based on a temperature detected by the temperature sensor so that the internal temperature of the smoking chamber is maintained at a temperature that allows activation of fermentation bacteria. According to the present aspect, fermentation is promoted.

The cooling unit may be a fan or Peltier element configured to forcibly cool the communication path. The temperature of smoke can be changed by controlling the fan or Peltier element. According to the present aspect, various smoked products can be manufactured.

The smoking device may further include a rotary table which is rotatably provided in the smoking chamber, which includes a plurality of holes through which smoke is allowed to pass, and on which a raw material of a smoked food product is placed. According to the present aspect, a surface of the raw material of a smoked food product on the rotary table is uniformly exposed to smoke, whereby a favorable smoked product is manufactured.

An exemplary embodiment of the present disclosure will be described below with reference to the accompanying drawings.

Figure 2:
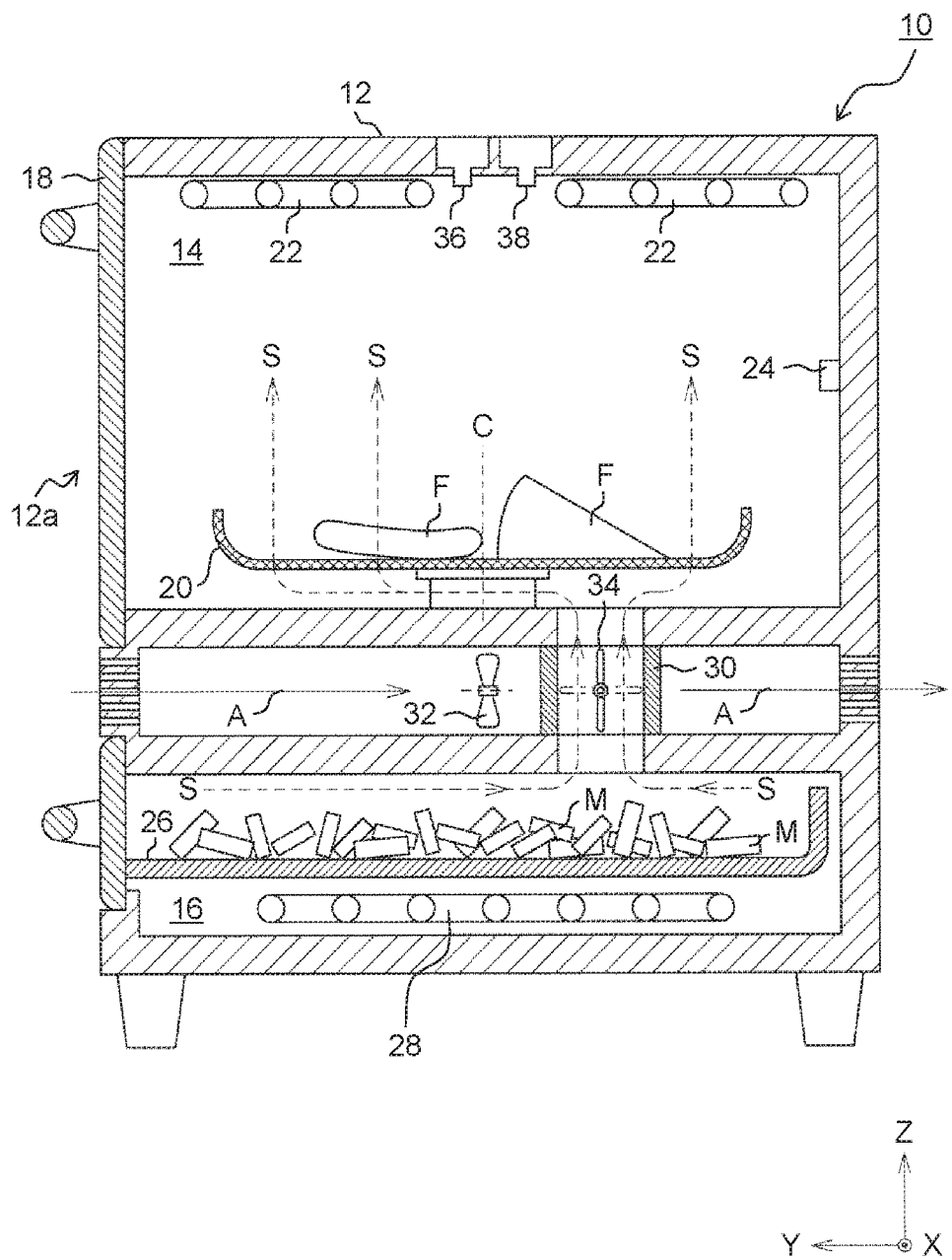
FIG. 2 is a schematic cross-sectional view of the smoking device.
Figure 3:
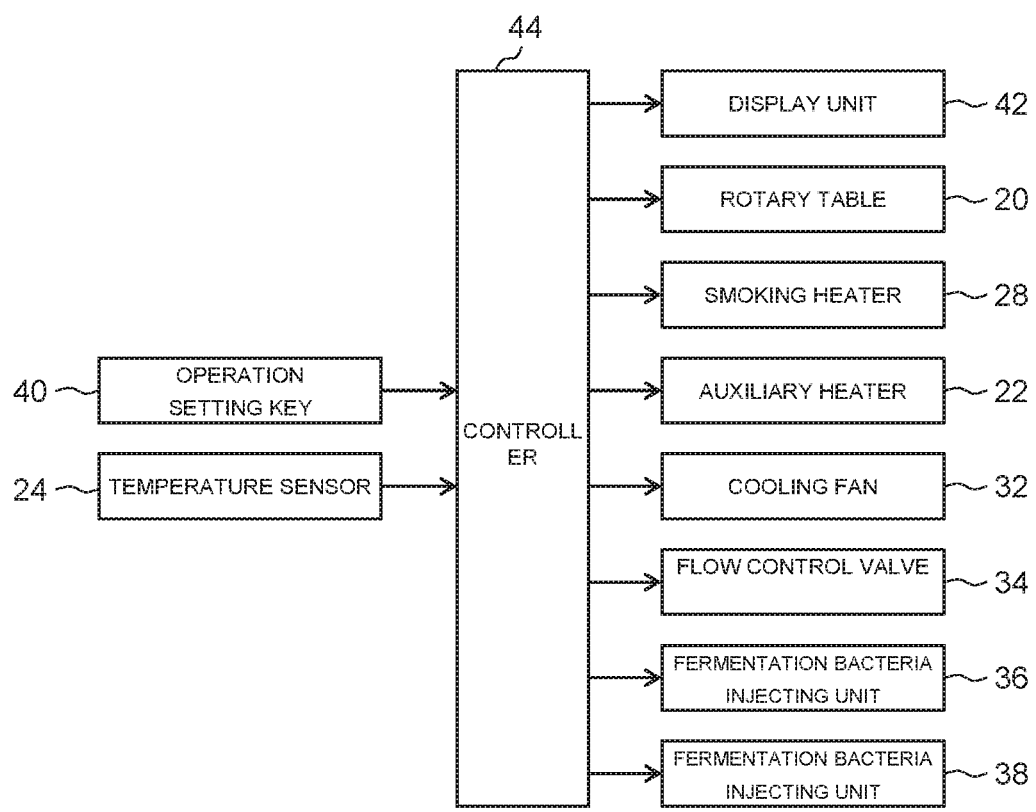
FIG. 3 is a block diagram illustrating a control system of the smoking device.

FIG. 1 is a schematic perspective view of a smoking device according to an exemplary embodiment of the present disclosure. FIG. 2 is a schematic cross-sectional view of the smoking device. FIG. 3 is a block diagram illustrating a control system of the smoking device. In FIGS. 1 and 2, an X-axis direction represents a width direction of the smoking device, a Y-axis direction represents a depth direction of the smoking device, and a Z-axis direction represents a height direction of the smoking device.

Although described later in detail, smoking device 10 illustrated in FIG. 1 is a smoking device having a fermentation function and capable of manufacturing a fermented food product as well as a smoked food product. In other words, smoking device 10 is also a fermentation device. Examples of smoked food products manufactured by smoking device 10 include smoked sausages, smoked cheese, and smoked eggs. Examples of fermented food products manufactured by smoking device 10 include sweet fermented rice drink and fermented drink.

As illustrated in FIGS. 1 and 2, smoking device 10 includes body 12 having a substantially rectangular parallelepiped shape. Body 12 includes therein smoking chamber 14 and smoke generating chamber 16.

Smoking chamber 14 is a space in which raw material F of a smoked food product or a fermented food product is housed to manufacture the smoked food product or the fermented food product. In other words, when fermentation of raw material F is performed in smoking chamber 14, smoking chamber 14 functions as a fermentation chamber.

Body 12 of smoking device 10 includes an opening provided on a front 12a side of body 12, and door 18 configured to close the opening.

As illustrated in FIG. 2, rotary table 20 is provided in smoking chamber 14. Raw material F of a smoked food product or a fermented food product is placed on rotary table 20. Rotary table 20 is rotatable about rotation center line C extending in the height direction (Z-axis direction), and includes a mesh member or a punching metal through which smoke is allowed to pass.

Auxiliary heater 22 is provided in smoking chamber 14. Auxiliary heater 22 is an auxiliary heating unit configured to heat inside of smoking chamber 14 in an auxiliary manner and including, for example, an electrically heated wire. In the present exemplary embodiment, auxiliary heater 22 is attached to a ceiling surface of smoking chamber 14. The function of auxiliary heater 22 will be described later.

Temperature sensor 24 configured to detect the temperature inside smoking chamber 14 is provided in smoking chamber 14. In the present exemplary embodiment, temperature sensor 24 is attached to a side surface of smoking chamber 14. The function of temperature sensor 24 will be described later.

As illustrated in FIGS. 1 and 2, smoke generating chamber 16 is disposed below smoking chamber 14. Smoke S necessary for manufacturing a smoked product in smoking chamber 14 is generated in smoke generating chamber 16. In the present exemplary embodiment, smoke generating chamber 16 is disposed below smoking chamber 14 with a gap between smoke generating chamber 16 and smoking chamber 14. Specifically, smoke generating chamber 16 is disposed below smoking chamber 14 with a space interposed between smoke generating chamber 16 and smoking chamber 14. This configuration reduces heat transfer between smoke generating chamber 16 and smoking chamber 14.

Specifically, smoking material M is housed in smoke generating chamber 16. Smoking material M is preferably wood chips made of a broadleaf tree such as oak or zelkova that contains a small amount of a resin component and is unlikely to generate soot, which would adhere to raw material F. In addition, smoking material M is preferably wood chips that generate smoke containing a large amount of phenols at smoking. This will be described later in detail.

As illustrated in FIG. 2, smoking material M is placed on metal tray 26 disposed in smoke generating chamber 16. Tray 26 is supported by body 12 so as to be pulled out to the front 12a side of body 12.

Smoking heater 28 as a smoking heating unit for heating (smoking) smoking material M on tray 26 is disposed below tray 26. Smoking heater 28 includes, for example, an electrically heated wire. When smoking heater 28 heats smoking material M, smoke is generated from smoking material M.

Smoke S generated in smoke generating chamber 16 is supplied to smoking chamber 14 through communication path 30. In the present exemplary embodiment, as illustrated in FIG. 2, communication path 30 is a tubular path extending in the height direction (Z-axis direction). Communication path 30 communicates smoke generating chamber 16 with smoking chamber 14 by connecting an opening formed in a ceiling surface of smoke generating chamber 16 and an opening formed in a bottom surface of smoking chamber 14.

Smoke S generated in smoke generating chamber 16 is supplied to smoking chamber 14 through communication path 30. When smoke S passes through rotary table 20, the entire surface of raw material F placed on rotating rotary table 20 is uniformly exposed to smoke S. Accordingly, a favorable smoked product is obtained.

In place of or in addition to rotary table 20, a rail (not illustrated) from which raw material F is hanged may be provided on the ceiling surface of smoking chamber 14.

In the present exemplary embodiment, cooling fan 32 is provided in body 12. Cooling fan 32 is a cooling unit configured to forcibly cool smoke S generated in smoke generating chamber 16 and passing through communication path 30, by blowing cooling air A toward communication path 30.

Raw material F can be manufactured into a smoked product through a sufficient amount of smoke S at various temperatures by adjusting the rotation speed of cooling fan 32. With this configuration, the temperature of smoke S passing through communication path 30 can be adjusted without changing the output power of smoking heater 28. Accordingly, hot smoking, warm smoking, and cold smoking can be executed by using a sufficient amount of smoke S.

For example, smoking heater 28 heats smoking material M at a maximum output power to generate a sufficient amount of smoke S at high temperature in smoke generating chamber 16. When smoke S passes through communication path 30, cooling fan 32 cools smoke S down to a temperature (for example, 30° C. to 80° C.) suitable for warm smoking or a temperature (for example, 30° C. to 50° C.) suitable for cold smoking. Accordingly, a sufficient amount of smoke S is supplied into smoking chamber 14 at a temperature suitable for warm smoking or cold smoking so that raw material F can be manufactured into a desired smoked product in a short time.

According to the present exemplary embodiment, flow control valve 34 is provided to communication path 30. Flow control valve 34 is used to adjust the amount of smoke S passing through communication path 30. Fine setting can be performed on a smoking condition by adjusting, through flow control valve 34, the amount of smoke S flowing into smoking chamber 14.

As described above, smoking device 10 can manufacture a fermented food product. Smoking device 10 includes fermentation bacteria injecting unit 36 and fermentation bacteria injecting unit 38 for injecting fermentation bacteria into smoking chamber 14. Examples of the fermentation bacteria include lactic acid bacteria, yeast, and malted rice. The two fermentation bacteria injecting units are provided to inject two kinds of fermentation bacteria. Fermentation bacteria injecting units 36, 38 correspond to first and second fermentation bacteria injecting units, respectively.

The following describes control for manufacturing a smoked food product or a fermented food product in smoking device 10 configured as described above.

FIG. 3 is a block diagram illustrating a control system of smoking device 10.

As illustrated in FIG. 3, controller 44 of smoking device 10 controls display unit 42, rotary table 20, smoking heater 28, auxiliary heater 22, cooling fan 32, flow control valve 34, and fermentation bacteria injecting units 36, 38 in accordance with output signals from operation setting key 40 and temperature sensor 24.

As illustrated in FIG. 1, operation setting key 40 is provided on front 12a of body 12. A user uses operation setting key 40 to select an operation of smoking device 10, for example, any one of a smoking mode in which a smoked food product is manufactured, a fermentation mode in which a fermented food product is manufactured, and a fermentation smoking mode in which a long-storage fermented food product is manufactured.

In the smoking mode, the user sets, through operation setting key 40, smoking conditions such as the kind and weight of raw material F, the kind of smoking material M, a smoking temperature, and a smoking time. In the fermentation mode, the user sets through operation setting key 40, fermentation conditions such as the kind and weight of raw material F, the kind of fermentation bacteria, and a fermentation time. In the fermentation smoking mode, the user sets, through operation setting key 40, conditions such as the kind and weight of raw material F, the kind of smoking material M, and the kind of fermentation bacteria.

Controller 44 displays items set through operation setting key 40 onto display unit 42 illustrated in FIG. 1, and controls, in accordance with these setting items, smoking heater 28, auxiliary heater 22, cooling fan 32, flow control valve 34, and fermentation bacteria injecting units 36, 38. While a smoked product is being manufactured or fermentation is being performed, display unit 42 may display details of this operation and a time until its completion.

The following describes the smoking mode, the fermentation mode, and the fermentation smoking mode in detail with reference to timing charts.

Figure 4:
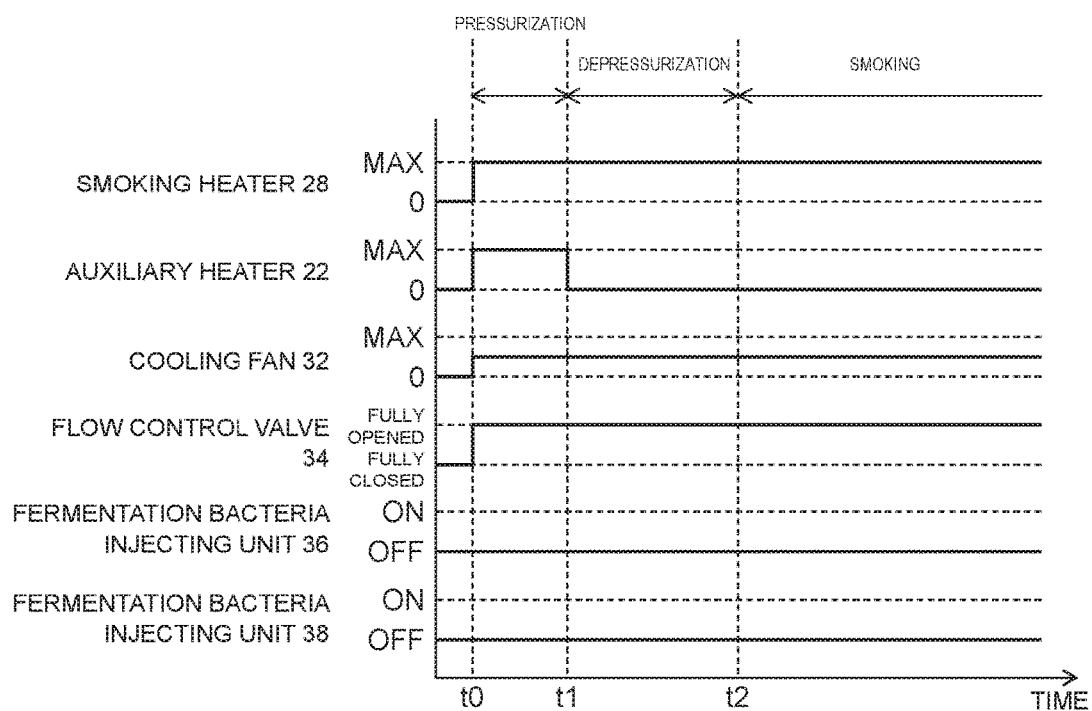
FIG. 4 is a timing chart for an exemplary smoking mode.

FIG. 4 is a timing chart for warm smoking at 30° C. to 80° C. in an exemplary smoking mode.

As illustrated in FIG. 4, when operation setting key 40 is operated to start the smoking mode at timing t0 after raw material F of a smoked food product is housed in smoking chamber 14, smoking chamber 14 is first pressurized. After a while, pressurized smoking chamber 14 is depressurized.

Smoking chamber 14 is temporarily pressurized and then depressurized to reduce external leakage of smoke S and smell from smoking chamber 14 while a smoked product is being manufactured.

More specifically, smoking chamber 14 is not completely sealed when door 18 is closed because external air needs to be taken into body 12 to generate smoke S in smoke generating chamber 16. With this configuration, a small amount of smoke S leaks outward while a smoked product is being manufactured. In order to minimize this leakage of smoke S, the pressure inside smoking chamber 14 is made lower than atmospheric pressure P0.

Figure 5:
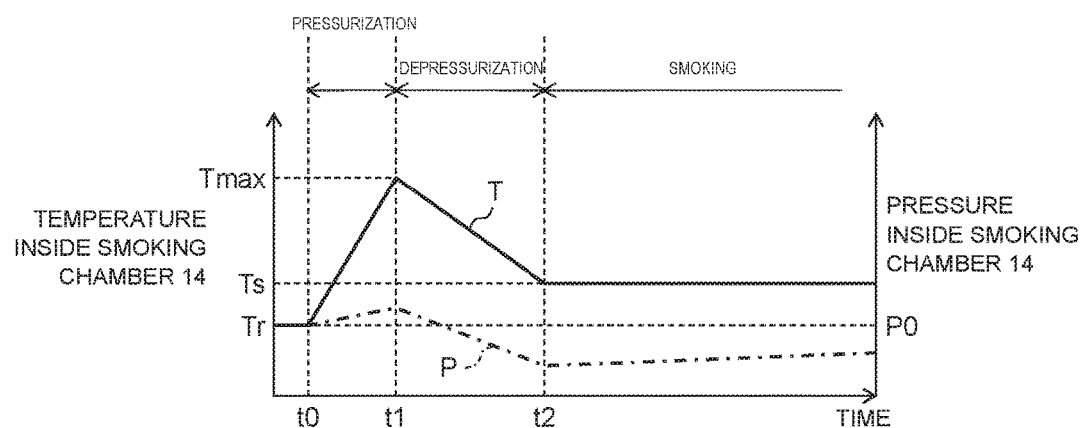
FIG. 5 is a diagram illustrating temperature change in a smoking chamber corresponding to the timing chart illustrated in FIG. 4.

As illustrated in FIG. 5, internal temperature T of smoking chamber 14 is adjusted to temporarily pressurize and then depressurize smoking chamber 14.

Internal temperature T of smoking chamber 14, which is substantially equal to room temperature Tr of a room in which smoking device 10 is installed before the manufacturing of a smoked product starts at timing t0, is increased to a maximum temperature Tmax higher than the smoking temperature Ts (for example, 50° C.). Maximum temperature Tmax is a temperature at which a temperature detected by temperature sensor 24 stop increasing.

Pressure P inside smoking chamber 14 increases as internal temperature T of smoking chamber 14 increases. The smoking temperature Ts is calculated by controller 44 in accordance with a set smoking condition.

As illustrated in FIG. 4, in order to increase internal temperature T of smoking chamber 14 to maximum temperature Tmax, controller 44 maximizes the output power of smoking heater 28 to generate smoke S at high temperature, and maximizes the output power of auxiliary heater 22. In addition, controller 44 sets the rotation speed of cooling fan 32 to be a rotation speed when raw material F is manufactured into a smoked product at the smoking temperature Ts.

Accordingly, as illustrated in FIG. 5, internal temperature T of smoking chamber 14 exceeds the smoking temperature Ts and reaches maximum temperature Tmax at timing t1. Pressure P inside smoking chamber 14 increases as this temperature increase. However, smoking chamber 14 is not sealed, and thus pressure P inside smoking chamber 14 is only slightly higher than atmospheric pressure P0.

As illustrated in FIG. 5, when internal temperature T of smoking chamber 14 reaches maximum temperature Tmax at timing t1, smoking chamber 14 is filled with smoke S, and pressure P inside smoking chamber 14 is higher than atmospheric pressure P0. Then, controller 44 stops auxiliary heater 22. As a result, as illustrated in FIG. 5, internal temperature T of smoking chamber 14 decreases toward the smoking temperature Ts. The pressure inside smoking chamber 14 decreases along this temperature decrease. However, since smoking chamber 14 is not sealed, pressure P inside smoking chamber 14 is only slightly lower than atmospheric pressure P0.

As illustrated in FIG. 5, as internal temperature T of smoking chamber 14 decreases, pressure P inside smoking chamber 14 becomes lower than atmospheric pressure P0. As a result, external leakage of smoke S from inside of smoking chamber 14 is reduced.

At timing t2, pressure P inside smoking chamber 14 decreases until internal temperature T reaches the smoking temperature Ts. When internal temperature T reaches the smoking temperature Ts, the decrease of pressure P inside smoking chamber 14 ends and external air is gradually taken into smoking chamber 14, so that pressure P inside smoking chamber 14 gradually increases toward atmospheric pressure P0.

When a pressure sensor provided in smoking chamber 14 to detect the pressure inside smoking chamber 14 detects pressure substantially equal to atmospheric pressure P0 while a smoked product is being manufactured, heating by auxiliary heater 22 may be executed until internal temperature T of smoking chamber 14 reaches maximum temperature Tmax. Accordingly, the pressure inside smoking chamber 14 can be maintained at pressure lower than atmospheric pressure P0. As a result, leakage of smoke S can be reduced until the manufacturing of a smoked product is completed.

In the manufacturing of a smoked product at the smoking temperature Ts, controller 44 continues heating of smoking material M and operation of cooling fan 32 until the set smoking time has elapsed. Controller 44 may calculate the smoking time in accordance with a set smoking condition, and continue heating of smoking material M and operation of cooling fan 32 until the smoking time has elapsed.

As illustrated in FIG. 4, in the smoking mode, flow control valve 34 is fully opened, and fermentation bacteria injecting units 36, 38 are not actuated.

Since warm smoking is performed in the example illustrated in FIG. 4, smoke S is forcibly cooled by cooling fan 32 before flowing into smoking chamber 14 and auxiliary heater 22 is not used, while a smoked product is being manufactured. In a case of cold smoking, in which the smoking temperature is lower than in warm smoking, cooling fan 32 is driven at a maximum rotation speed. In a case of hot smoking, in which the smoking temperature is higher than in warm smoking, cooling fan 32 stops, and smoke S is naturally cooled when passing through communication path 30, and then heated again in smoking chamber 14 by auxiliary heater 22.

In this manner, the temperature of smoke S can be adjusted by controlling cooling fan 32 configured to forcibly cool smoke S passing through communication path 30 and auxiliary heater 22 configured to heat inside of smoking chamber 14. The temperature of smoke S can be adjusted while generation of a sufficient amount of smoke S is maintained, without changing the output power of smoking heater 28.

Accordingly, various smoked products can be manufactured by using a sufficient amount of smoke S at various temperatures. In other words, warm smoking and cold smoking can be executed with a sufficient amount of smoke S.

Figure 6:
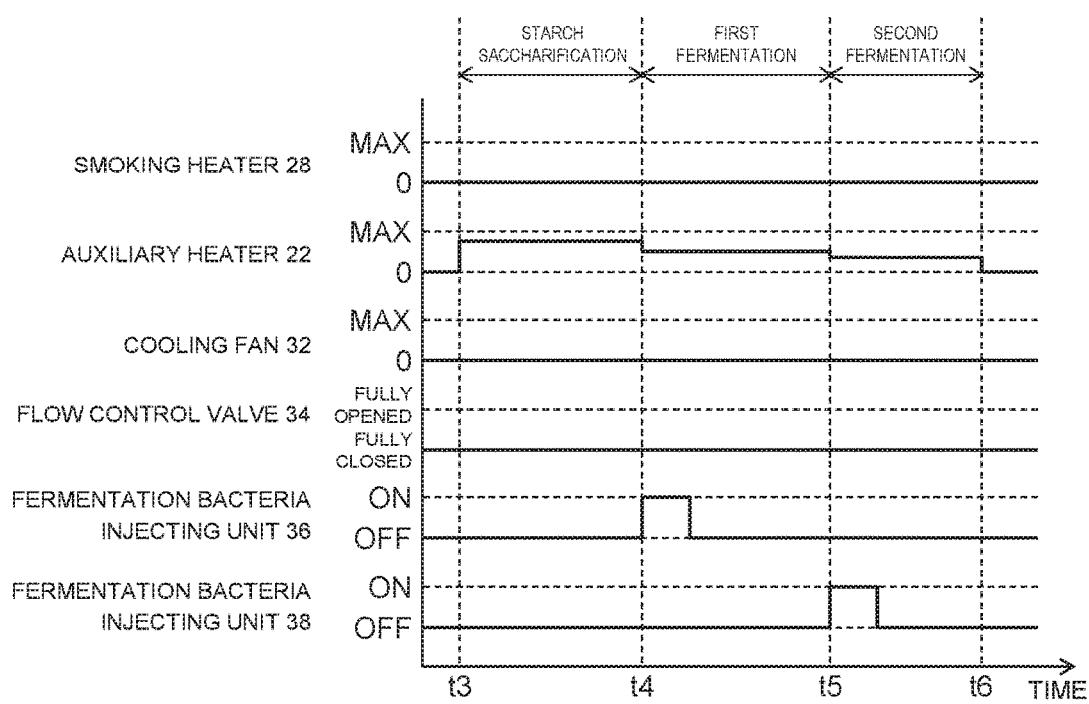
FIG. 6 is a timing chart for an exemplary fermentation mode.

FIG. 6 is a timing chart for manufacturing of fermented drink by using malted rice, rice, water, lactic acid bacteria, and yeast in an exemplary fermentation mode.

As illustrated in FIG. 6, smoking heater 28 and cooling fan 32 are not used, and flow control valve 34 is fully closed. In other words, smoking chamber 14 is separated from smoke generating chamber 16 to allow smoking chamber 14 to function as a fermentation chamber.

In the exemplary fermentation mode illustrated in FIG. 6, the user sets lactic acid bacteria to fermentation bacteria injecting unit 36, and yeast to fermentation bacteria injecting unit 38. The user places, in smoking chamber 14, a sterilized and cleaned container housing malted rice, rice, and water.

At timing t3, when operation setting key 40 is operated to start the fermentation mode, controller 44 heats, through auxiliary heater 22, water including the malted rice and the rice inside the container, and maintains the water at a set temperature (for example, 55° C.). This promotes saccharification of a starch component of the rice by the malted rice. Controller 44 may calculate a temperature in accordance with a set fermentation condition, and maintain, at the temperature, the water including the malted rice and the rice inside the container.

At timing t4, when a set or calculated saccharification time has elapsed since the start of fermentation at timing t3, the saccharification of starch is completed. Then, controller 44 causes fermentation bacteria injecting unit 36 to inject lactic acid bacteria into the container inside smoking chamber 14. Accordingly, the liquid inside the container starts fermenting through the lactic acid bacteria. This is referred to as first fermentation. In the first fermentation, smoking chamber 14 is maintained, by auxiliary heater 22, at a first fermentation temperature (for example, 15° C.) set through operation setting key 40. The first fermentation is continued during a first fermentation time.

Controller 44 may calculate the first fermentation temperature and the first fermentation time in accordance with the set fermentation condition, and perform the first fermentation with the calculated first fermentation temperature and the calculated first fermentation time.

When the first fermentation is completed at timing t5, controller 44 actuates fermentation bacteria injecting unit 38 to inject yeast into the liquid inside the container, which is fermented with the lactic acid bacteria. Accordingly, the liquid inside the container starts fermenting through the yeast. This is referred to as second fermentation. In the second fermentation, smoking chamber 14 is maintained, by auxiliary heater 22, at a second fermentation temperature (for example, 10° C.) set through operation setting key 40. The second fermentation is continued during a second fermentation time.

Controller 44 may calculate the second fermentation temperature and the second fermentation time in accordance with the set fermentation condition, and perform the second fermentation with the calculated second fermentation temperature and the calculated second fermentation time. In this manner, fermented drink is manufactured in smoking chamber 14.

Figure 7:
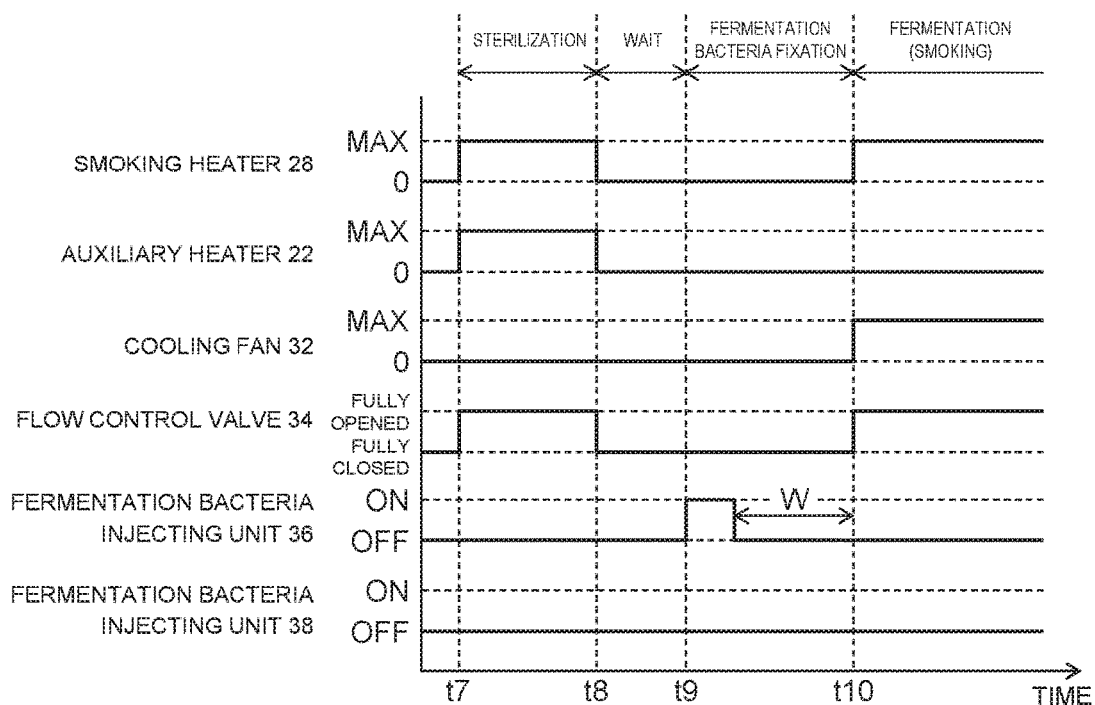
FIG. 7 is a timing chart for an exemplary fermentation smoking mode.

FIG. 7 is a timing chart for manufacturing of a long-storage fermented food product in an exemplary fermentation smoking mode.

As illustrated in FIG. 7, at timing t7, when operation setting key 40 is operated to start the fermentation smoking mode, controller 44 performs sterilization of raw material F of a fermented food product placed in smoking chamber 14.

In the sterilization of raw material F of a fermented food product, controller 44 maximizes the output powers of smoking heater 28 and auxiliary heater 22, and stops cooling fan 32. With this configuration, smoke S at high temperature is supplied into smoking chamber 14 so that raw material F of a fermented food product inside smoking chamber 14 is sterilized at high temperature. Accordingly, a long-storage fermented food product can be manufactured.

At timing t8, the high-temperature sterilization of raw material F of a fermented food product is completed. Specifically, smoking heater 28 and auxiliary heater 22 stop, and flow control valve 34 is fully closed. Controller 44 waits until the internal temperature of smoking chamber 14 decreases to a temperature at which fermentation bacteria are not killed. When lactic acid bacteria are used, this temperature is 40° C., at which lactic acid bacteria are activated.

At timing t9, the internal temperature of smoking chamber 14 decreases to the temperature at which fermentation bacteria are not killed. Then, controller 44 actuates fermentation bacteria injecting unit 36 to inject fermentation bacteria into smoking chamber 14. Accordingly, the fermentation bacteria adhere to raw material F of a fermented food product, which is subjected to the high-temperature sterilization.

Controller 44 waits until the fermentation bacteria adhered to raw material F of a fermented food product enters into raw material F and becomes fixed to raw material F. This time (wait time W) is set through operation setting key 40. Controller 44 may calculate wait time W in accordance with the set fermentation condition.

Smoking chamber 14 may be heated by auxiliary heater 22 to promote the fixation of the fermentation bacteria to raw material F of a fermented food product. For example, when lactic acid bacteria or *bacillus* natto are used, maintaining the internal temperature of smoking chamber 14 at around 40° C. activates the fermentation bacteria and promotes the fixing of the fermentation bacteria to raw material F.

At timing t10, controller 44 fully opens flow control valve 34, and actuates smoking heater 28 to start heating smoking material M. Accordingly, smoke S is generated from smoking material M and supplied into smoking chamber 14.

Through natural cooling or forced cooling while passing through communication path 30, smoke S is cooled to a temperature at which the fermentation bacteria are not killed but activated. Accordingly, sterilization of the fermentation bacteria by smoke S at high temperature is reduced.

When smoke S is supplied into smoking chamber 14, the fermentation bacteria inside raw material F of a fermented food product are activated, and fermentation proceeds. Specifically, for example, phenols and aldehyde included in smoke S react with raw material F of a fermented food product to form a resin membrane on the surface of raw material F. This coating of raw material F with the resin membrane prevents bacteria from entering into the fermented food product.

In the present exemplary embodiment, since raw material F is sterilized before the adhesion of the fermentation bacteria, coated raw material F contains almost no bacteria. According to the present exemplary embodiment, a long-storage fermented food product can be manufactured through the sterilization before the adhesion of the fermentation bacteria, and the coating by the resin membrane after the fixing of the fermentation bacteria.

In the fermentation smoking mode, controller 44 controls smoking heater 28 so that the temperature inside smoking chamber 14 is maintained at a temperature that allows activation of the fermentation bacteria. With this configuration, sterilization of the fermentation bacteria can be reduced, and activation of the fermentation bacteria can be achieved. Accordingly, a long-storage fermented food product can be manufactured more reliably in a shorter time.

The supply of smoke S into smoking chamber 14 is performed after wait time W has elapsed since the injection of the fermentation bacteria into smoking chamber 14, because the fermentation potentially fails to proceed when the supply is performed right after or simultaneously with the injection of the fermentation bacteria.

Specifically, the failure occurs potentially because smoke S prevents the adhesion of the fermentation bacteria to the surface of raw material F. The failure also occurs potentially because the fermentation bacteria adhered to the surface of raw material F cannot grow while being taken into the resin membrane formed on the surface.

In the present exemplary embodiment, after wait time W has elapsed and a sufficient amount of fermentation bacteria has entered inside raw material F, smoke S is supplied into smoking chamber 14. According to the present exemplary embodiment, a desired smoked product can be manufactured by using a sufficient amount of smoke at any smoking temperature.

The present disclosure is described in the above-described exemplary embodiment, but is not limited to the above-described exemplary embodiment.

For example, in the above-described exemplary embodiment, smoking device 10 includes fermentation bacteria injecting units 36, 38 to achieve the fermentation function. However, the smoking device according to the present disclosure does not necessarily need to have the fermentation function.

Although smoking device 10 includes auxiliary heater 22 in the above-described exemplary embodiment, the present disclosure is not limited thereto. For example, when the temperature of smoke S after naturally cooled through communication path 30 is a temperature at which hot smoking can be performed, auxiliary heater 22 may be omitted.

Although communication path 30 is a tubular member in the above-described exemplary embodiment, but the present disclosure is not limited thereto. For example, communication path 30 may have a helical shape or a meander shape to further cool smoke S before arriving at smoking chamber 14. Longer communication path 30 may be provided to further cool smoke S.

Communication path 30 may be provided in any configuration and any number as long as communication path 30 can supply smoke generated in smoke generating chamber 16 to smoking chamber 14.

Although cooling fan 32 is provided as a cooling unit in the above-described exemplary embodiment, the present disclosure is not limited thereto. For example, smoke passing through the communication path may be forcibly cooled by a Peltier element attached to the communication path.

Similarly to cooling fan 32, the temperature of the smoke can be adjusted by using the Peltier element.

The cooling unit is not limited to a device such as cooling fan 32 configured to perform forced cooling, but may be a device configured to perform natural cooling. For example, the cooling unit may be a plurality of fins formed on the outer peripheral surface of the tubular communication path. The cooling scheme of the cooling unit is not limited to air cooling but may be liquid cooling.

In the above-described exemplary embodiment, as illustrated in FIG. 2, smoke S is generated in smoke generating chamber 16, which is a space different from smoking chamber 14 in which the raw material of a fermented food product is housed. Instead, smoke may be generated in smoking chamber 14. However, when fermentation bacteria have low resistance against high temperature, the sterilization of the fermentation bacteria by smoke needs to be reduced. In other words, similarly to the above-described exemplary embodiment, it is needed to generate smoke in smoke generating chamber as a space different from smoking chamber 14, and forcibly or naturally cool the smoke when supplying the smoke to smoking chamber 14.

In the above-described exemplary embodiment, as illustrated in FIG. 7, raw material F inside smoking chamber 14 is sterilized at high temperature through smoke S before the injection of fermentation bacteria into smoking chamber 14. However, the sterilization through the smoke may be omitted, for example, by housing the sterilized raw material in smoking chamber 14.

INDUSTRIAL APPLICABILITY

The present disclosure is applicable to a smoking device configured to generate smoke for manufacturing a smoked product.

What is claimed is:

1. A smoking device comprising:
a smoking chamber housing a raw material of a smoked food product;
a smoke generating chamber disposed below the smoking chamber;
a smoking heating unit configured to generate smoke in the smoke generating chamber by heating a smoking material housed in the smoke generating chamber; and
a cooling unit configured to cool smoke passing through a communication path for communicating the smoking chamber with the smoking generating chamber, wherein the cooling unit is disposed between the smoking chamber and the smoke generating chamber, and wherein the communication path extends through the cooling unit.

2. The smoking device according to claim 1, further comprising: an auxiliary heating unit configured to heat the smoking chamber in an auxiliary manner.

3. The smoking device according to claim 2, further comprising:
a controller configured to control the smoking heating unit and the auxiliary heating unit,
wherein the controller is configured to stop, after having heated the smoking chamber by using both of the smoking heating unit and the auxiliary heating unit until an internal temperature of the smoking chamber exceeds a smoking temperature, heating by the auxiliary heating unit to allow the internal temperature of the smoking chamber to decrease to the smoking temperature so that a pressure inside the smoking chamber becomes lower than an outside air pressure.

4. A smoking device, comprising:
a smoking chamber housing a raw material of a smoked food product;
a smoke generating chamber disposed below the smoking chamber;
a smoking heating unit configured to generate smoke in the smoke generating chamber by heating a smoking material housed in the smoke generating chamber;
a communication path communicating the smoking chamber with the smoke generating chamber;
a cooling unit configured to cool smoke passing through the communication path;
a fermentation bacteria injecting unit configured to inject fermentation bacteria into the smoking chamber; and
a controller configured to control the fermentation bacteria injecting unit and the smoking heating unit,
wherein the controller is configured to cause the fermentation bacteria injecting unit to inject fermentation bacteria into the smoking chamber,
and the smoking heating unit to generate smoke in the smoking chamber after a predetermined wait time has elapsed since completion of the injection.

5. The smoking device according to claim 4, wherein the controller is configured to sterilize a raw material of a fermented food product by using the smoke generated in the smoking chamber by the smoking heating unit, before the injection of fermentation bacteria into the smoking chamber.

6. The smoking device according to claim 4, further comprising:
a temperature sensor configured to detect an internal temperature of the smoking chamber,
wherein the controller is configured to control the smoking heating unit, based on a temperature detected by the temperature sensor, so that the internal temperature of the smoking chamber is maintained at a temperature that allows activation of fermentation bacteria.

7. The smoking device according to claim 1, wherein the cooling unit is formed of a fan or a Peltier element configured to forcibly cool the communication path.

8. The smoking device according to claim 1, further comprising:
a rotary table which is rotatably provided in the smoking chamber, which includes a plurality of holes through which smoke is allowed to pass, and
on which the raw material of the smoked food product is placed.

* * * * *